US012713472B2

(12) United States Patent
Wei et al.

(10) Patent No.: US 12,713,472 B2
(45) Date of Patent: Aug. 18, 2026

(54) NETWORK ENTITY, USER EQUIPMENT AND METHOD

(71) Applicant: Sony Group Corporation, Tokyo (JP)

(72) Inventors: Yuxin Wei, Basingstoke (GB); Vivek Sharma, Basingstoke (GB); Hideji Wakabayashi, Basingstoke (GB); Yassin Aden Awad, Basingstoke (GB)

(73) Assignee: SONY GROUP CORPORATION, Tokyo (JP)

( * ) Notice: Subject to any disclaimer, the term of this patent is extended or adjusted under 35 U.S.C. 154(b) by 495 days.

(21) Appl. No.: 17/777,285

(22) PCT Filed: Dec. 16, 2020

(86) PCT No.: PCT/EP2020/086402
§ 371 (c)(1),
(2) Date: May 17, 2022

(87) PCT Pub. No.: WO2021/122732
PCT Pub. Date: Jun. 24, 2021

(65) Prior Publication Data
US 2022/0400521 A1 Dec. 15, 2022

(30) Foreign Application Priority Data
Dec. 20, 2019 (EP) .................................... 19219023

(51) Int. Cl.
*H04W 76/10* (2018.01)
*H04W 48/02* (2009.01)

(52) U.S. Cl.
CPC .......... *H04W 76/10* (2018.02); *H04W 48/02* (2013.01)

(58) Field of Classification Search
CPC ..... H04W 76/10; H04W 48/02; H04W 76/36; H04W 48/06; H04W 24/02; H04W 28/18; H04W 28/24; G06N 20/00
See application file for complete search history.

(56) References Cited

U.S. PATENT DOCUMENTS 10,548,063 B1 * 1/2020 Liu ....................... H04L 47/824
2004/0053622 A1 3/2004 Nakakita et al.
(Continued)

FOREIGN PATENT DOCUMENTS

CN 101416449 A 4/2009
CN 108605032 A 9/2018
(Continued)

OTHER PUBLICATIONS

Batista et al., "Tenant-Aware Slice Admission Control using Neural Networks-Based Policy Agent", arxiv.org, Cornell University Library, 201 Olin Library Cornell University, Ithaca, NY 14853, Aug. 20, 2019. (Year: 2019).*
(Continued)

*Primary Examiner* — Jeffrey M Rutkowski
(74) *Attorney, Agent, or Firm* — XSENSUS LLP

(57) ABSTRACT

A network entity for a mobile telecommunications system, including circuitry configured to perform an admission control of a received connection request to the mobile telecommunications system, wherein the admission control is performed based on a plurality of admission control layers.

20 Claims, 6 Drawing Sheets

(56) References Cited

U.S. PATENT DOCUMENTS

| | | | | |
|---|---|---|---|---|
| 2012/0258713 | A1* | 10/2012 | Whinnett | H04W 48/20 455/435.1 |
| 2013/0272121 | A1 | 10/2013 | Stanwood | |
| 2014/0120930 | A1* | 5/2014 | Harris | H04W 24/02 455/422.1 |
| 2017/0118795 | A1* | 4/2017 | Guo | H04W 72/21 |
| 2018/0092135 | A1* | 3/2018 | Dash | H04W 76/18 |
| 2019/0223198 | A1* | 7/2019 | Halabian | H04W 48/02 |
| 2020/0106536 | A1* | 4/2020 | Bedekar | H04W 48/20 |
| 2020/0260318 | A1* | 8/2020 | Kousaridas | H04W 76/27 |
| 2020/0322873 | A1* | 10/2020 | Zachrison | H04W 28/0289 |

FOREIGN PATENT DOCUMENTS

| | | | | |
|---|---|---|---|---|
| GB | 2528124 | A | 1/2016 | |
| WO | WO-2019125248 | A1 * | 6/2019 | H04W 28/0289 |
| WO | WO-2020032638 | A1 * | 2/2020 | |

OTHER PUBLICATIONS

Fu et al., "Waiting time prediction: an enhancement for call admission control of mobile system using neural networks", Advanced Communication Technology, 2005, ICACT 2005; The 7th International Conference on Phoenix Park, Korea, Feb. 21-23, 2005, Piscataway, NJ, USA, IEEE, vol. 2, Feb. 21, 2005. (Year: 2005).*

International Search Report and Written Opinion mailed on Mar. 26, 2021, received for PCT Application PCT/EP2020/086402, Filed on Dec. 16, 2020, 18 pages.

Bashar et al., "A Novel Distributed Call Admission Control Solution based on Machine Learning Approach", Integrated Network Management (IM), 12th IFIP/IEEE International Symposium on IEEE, May 23, 2011, pp. 871-881.

Bojovic et al., "Bayesian and Neural Network Schemes for Call Admission Control in LTE systems", IEEE Global Communications Conference (GLOBECOM), IEEE, Dec. 9, 2013, pp. 1246-1252.

Inaba et al., "Performance Evaluation of a Fuzzy-Based Connection Admission Control System for Wireless Cellular Networks Considering Security and Priority Parameters", 2016 19th International Conference on Network-based Information Systems (NBIS), IEEE, Sep. 7, 2016, pp. 414-419.

Kumar et al., "Mobility Based Call Admission Control and Resource Estimation in Mobile Multimedia Networks Using Artificial Neural Networks", 2015 1st International Conference on Next Generation Computing Technologies (NGCT), IEEE, Sep. 4-5, 2015, pp. 852-857.

Batista et al., "Tenant-Aware Slice Admission Control using Neural Networks-Based Policy Agent", Arxiv.org, Cornell University Library, arXiv: 1908.07494v2, Jan. 13, 2020, 14 pages.

Fu et al: "Waiting Time Prediction: An Enhancement for Call Admission Control of Mobile System Using Neural Networks", Advanced Communication Technology, 2005, IEEE, vol. 2, Feb. 21, 2005, pp. 749-754.

Chen et al., "Fuzzy Q-Learning Admission Control for WCDMA/WLAN Heterogeneous Networks with Multimedia Traffic", IEEE Transactions on Mobile Computing, vol. 8, No. 11, Nov. 1, 2009, pp. 1469-1479.

ETSI, "Human Factors (HF); Quality of Experience (QoE) requirements for real-time communication services", ETSI TR 102 643 V1.0.1, Dec. 2009, pp. 1-37.

"Service-level agreement/", Wikipedia, Available Online at: https://en.wikipedia.org/wiki/Service-level_agreement/, Retrieved from Internet on: Apr. 13, 2022, 1 page.

* cited by examiner

Performing an admission control based on a plurality of admission control layers 51

Performing an admission control based on an output of a machine learning algorithm generated for a plurality of admission control layers 61

NETWORK ENTITY, USER EQUIPMENT AND METHOD

CROSS-REFERENCE TO RELATED APPLICATIONS

The present application is based on PCT filing PCT/EP2020/086402, filed Dec. 16, 2020, which claims priority to European Patent Application No. 19219023.9, filed Dec. 20, 2019, the entire contents of each are incorporated herein by reference.

TECHNICAL FIELD

The present disclosure generally pertains to a network entity and a user equipment of a mobile telecommunications system and a mobile telecommunications system method.

TECHNICAL BACKGROUND

Several generations of mobile telecommunications systems are known, e.g. the third generation ("3G"), which is based on the International Mobile Telecommunications-2000 (IMT-2000) specifications, the fourth generation ("4G"), which provides capabilities as defined in the International Mobile Telecommunications-Advanced Standard (IMT-Advanced Standard), and the current fifth generation ("5G"), which is under development and which might be put into practice in the year 2020.

A candidate for providing the requirements of 5G is the so-called Long Term Evolution ("LTE"), which is a wireless communications technology allowing high-speed data communications for mobile phones and data terminals and which is already used for 4G mobile telecommunications systems. Other candidates for meeting the 5G requirements are termed New Radio (NR) Access Technology Systems. An NR can be based on LTE technology, just as some aspect of LTE was based on previous generations of mobile communications technology.

LTE is based on the GSM/EDGE ("Global System for Mobile Communications"/"Enhanced Data rates for GSM Evolution" also called EGPRS) of the second generation ("2G") and UMTS/HSPA ("Universal Mobile Telecommunications System"/"High Speed Packet Access") of the third generation ("3G") network technologies.

LTE is standardized under the control of 3GPP ("3rd Generation Partnership Project") and there exists a successor LTE-A (LTE Advanced) allowing higher data rates than the basic LTE and which is also standardized under the control of 3GPP.

For the future, 3GPP plans to further develop LTE-A such that it will be able to fulfill the technical requirements of 5G.

As the 5G system may be based on LTE-A or NR, respectively, it is assumed that specific requirements of the 5G technologies will, basically, be dealt with by features and methods which are already defined in the LTE-A and NR standard documentation.

Additionally, for New Radio (NR) specific NR functionalities are known, such as Enhanced Mobile Broadband (eMBB), and Ultra Reliable & Low Latency Communications (URLLC).

Moreover, the rapid deployment of highly user-centric wireless services, such as virtual reality, places additional demands on the controlled reservation and allocation of network resources for the various services with different connection requirements.

Generally, it is known to implement an admission control process, e.g. in a base station, in order to evaluate if current network resources are sufficient for a connection establishment request of various different services.

Although there exist techniques for admission control to a mobile telecommunications system, it is generally desirable to improve the existing techniques.

SUMMARY

According to a first aspect, the disclosure provides a network entity for a mobile telecommunications system, comprising circuitry configured to perform an admission control of a received connection request to the mobile telecommunications system, wherein the admission control is performed based on a plurality of admission control layers.

According to a second aspect, the disclosure provides a network entity for a mobile telecommunications system, comprising circuitry configured to perform an admission control of a received connection request to the mobile telecommunications system, wherein the admission control is performed based on an output of a machine learning algorithm generated for a plurality of admission control layers.

According to a third aspect, the disclosure provides a user equipment for a mobile telecommunications system, comprising circuitry configured to receive a radio resource control message in response to the connection request to the mobile telecommunications system including an admission permission condition based on an output of a machine learning algorithm.

According to a fourth aspect, the disclosure provides a method for performing an admission control of a received connection request to a mobile telecommunications system, the method comprising: performing the admission control based on a plurality of admission control layers.

According to a fifth aspect, the disclosure provides a method for performing an admission control of a received connection request to a mobile telecommunications system, the method comprising: performing the admission control based on an output of a machine learning algorithm generated for a plurality of admission control layers.

Further aspects are set forth in the dependent claims, the following description and the drawings.

BRIEF DESCRIPTION OF THE DRAWINGS

Embodiments are explained by way of example with respect to the accompanying drawings, in which.

DETAILED DESCRIPTION OF EMBODIMENTS

Figure 2:
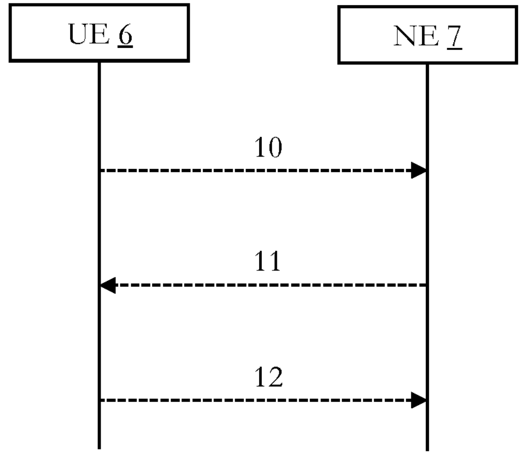
FIG. 2 illustrates an embodiment of a delayed radio resource control connection setup sequence.

Before a detailed description of the embodiments under reference of FIG. 2, general explanations are made.

As mentioned in the outset, in general, several generations of mobile telecommunications systems are known, e.g. the third generation ("3G"), which is based on the International Mobile Telecommunications-2000 (IMT-2000) specifications, the fourth generation ("4G"), which provides capabilities as defined in the International Mobile Telecommunications-Advanced Standard (IMT-Advanced Standard), and the current fifth generation ("5G"), which is under development and which might be put into practice in the year 2020.

One of the candidates for meeting the 5G requirements are termed New Radio (NR) Access Technology Systems. Some aspects of NR can be based on LTE technology, in some embodiments, just as some aspects of LTE were based on previous generations of mobile communications technology.

As mentioned in the outset, two new functionalities for the New Radio (NR) Access Technology are Enhanced Mobile Broadband (eMBB) and Ultra Reliable & Low Latency Communications (URLLC) services.

Figure 1:
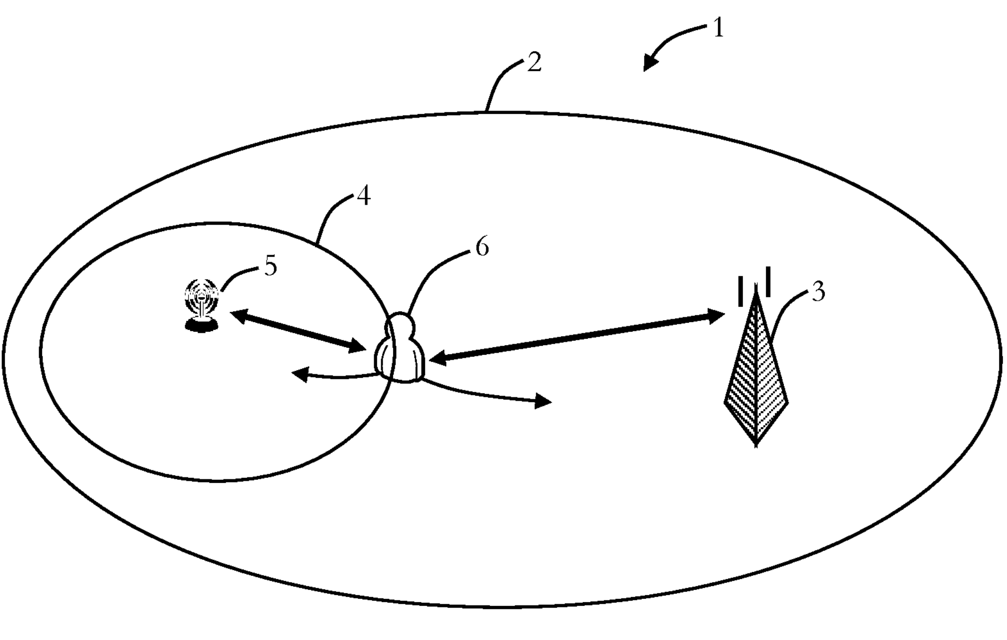
FIG. 1 illustrates an embodiment of a radio access network.

A typical embodiment of an NR radio access network RAN 1, as an example of a mobile telecommunications system, is illustrated in FIG. 1. The RAN 1 has a macro cell 2, which is established by an LTE eNodeB 3, and an NR cell 4, which is established by an NR eNodeB 5 (also referred to as gNB (next generation eNodeB)).

A UE 6 can communicate with the LTE eNodeB 3 and, as long as it is within the NR cell 4, it can also communicate with the NR eNodeB 5.

As also mentioned in the outset, the rapid deployment of highly user-centric wireless services, such as virtual reality ("VR"), places additional demands on the controlled reservation and allocation of network resources of a mobile telecommunications system for the various services having different connection requirements.

Thus, in some embodiments, admission control is a process implemented in base station in order to evaluate if current network resources are sufficient for an establishment of a connection (admission permission) for a received connection request which may originate from various different services. It has been recognized that the performance of admission control has a great impact on the network capacity and the user experience.

In some embodiments, an intelligent admission control algorithm has the following characteristics (requirements):

1) In some embodiments, admission control takes the service requirement, e.g. QoS ("Quality of Service"), into account from both short-term and long-term connections. For example, a received connection request from a URLLC service and from a VR gaming service are treated in some embodiments in a different way. A URLLC service may be a short-term connection, but should not be interrupted, so that the service continuation is vital. A VR gaming service may be a resource hungry service and, thus, in some embodiments it is determined whether the required network resources can be continuously provided to a user of the VR gaming service, since it will be a bad user experience if the user is to be forced to quit the game because of limited available network resources.
2) In some embodiments, admission control takes a joint optimization including network resource allocation and/or network resource reservation into account.
3) In some embodiments, admission control takes the user experience into account. An improvement of the user experience may be an important target of mobile telecommunications system operators in some embodiments, although user experience is a subjective concept. In such embodiments, a handover is the key area to improve user experience and admission control plays a key part in it.
4) In some embodiments, admission control takes differential admission control among users into account.
5) In some embodiments, admission control takes the network slicing into account.

For providing the above-mentioned admission control characteristics, the admission control determines in some embodiments which user or service and/or which part of a specific user's service will be accepted to the mobile telecommunications systems according to:

1) A (predicted) number of user and service requests.
2) A system capacity.
3) A Quality of Experience ("QoE") and/or a predicted quality.
4) A service level agreement ("SLA") and/or a predicted level.

Hence, in some embodiments, those users or services who cannot be accepted in a current situation, the admission control gives instructions in some embodiments when it could get access to the network, according to the (predicted) user and service quantities.

In general, in some embodiments, the QoE is defined based on human perception and varies depending on the applications. An example of QoE is provided in the following ETSI ("European Telecommunications Standard Institute") specification: ETSI TR 102 643 V1.0.1 (2009-12) Quality of Experience (QoE) requirements for real-time communication services.

An SLA (Service Level Agreement) may be any commercial contract between a telecommunications provider and a customer. There are various examples, but the following website of Wikipedia generally explains the contents of it: "https://en.wikipedia.org/wiki/Service-leveLagreement", which may also be applied in some embodiments.

In view of the above, it has been recognized that an admission control could be based on a plurality of admission control layers which make admission control according to different policies in order to take the various requirements into account.

Hence, some embodiments pertain to a network entity for a mobile telecommunications system, comprising circuitry configured to perform an admission control of a received connection request to the mobile telecommunications system, wherein the admission control is performed based on a plurality of admission control layers.

The network entity may be a base station, such as an eNodeB, a NR gNB, or the like as a part of the mobile telecommunications system, which may be based on UMTS, LTE, LTE-A, or an NR, 5G system or the like. The entity may also be any other entity of a mobile telecommunications system and may be located anywhere in the system.

The circuitry may include at least one of: a processor, a microprocessor, a dedicated circuit, a memory, a storage, a radio interface, a wireless interface, a network interface, or the like, e.g. typical electronic components which are included in a base station, such as an eNodeB, NR gNB, a user equipment, or the like. It may include an interface, such as a mobile telecommunications system interface which is adapted to provide communication to and/or from the mobile telecommunications system. It may also include a wireless interface, e.g. a wireless local area network interface, a Bluetooth interface, etc.

In some embodiments, the network entity receives a connection request to the mobile telecommunications system, such as a RRC ("Radio Resource Control") connection request in a random access procedure over a RACH ("Random Access Channel"), a RRC resume request, or the like from, for example, a user equipment and performs an admission control in order to determine an admission permission or an admission rejection of the received connection request, i.e. whether current resources of the mobile telecommunications system are sufficient to establish a connection. In general, this approach can be extended, in some embodiments, for any procedure during the Idle/inactive state to RRC Connected mode state transition signaling procedure and the connection request may be a corresponding message in such procedures and embodiments. It can also be extended, in some embodiments, to handling of the user plane data that a low priority UE should wait as new high priority service has been accepted and consuming resources and the connection request may be a corresponding message in such a procedure and embodiment. In such embodiments, this requires temporary change of QoS requirements, i.e. discard timer value is increased temporarily. The RACH may be contention-based, e.g. within its camped cell, or may be contention-less, e.g. during handover. In some embodiments related to handover situations, the RACH happens after a source network entity, i.e. base station, sends a handover request to a target network entity, i.e. base station, which acknowledges the handover and performs admission control of the connection request.

The procedure is based on the plurality of admission control layers, which includes, in some embodiments, a first layer making an admission control policy according to an SLA or any contract with the user, i.e. a service level layer. In some embodiments, the procedure includes a second layer making admission control policy according to a current situation, i.e. a network level layer. In some embodiments, the procedure includes a third layer making admission control policy according to different user requirements, i.e. a user level layer making user specific policy. The plurality of admission control layer includes, in some embodiments, only one layer or a combination of two layers or more than three layers making admission control according to a different than the above-mentioned policy. Thereby, an efficient management of services may be achieved in some embodiments.

Hence, in some embodiments, the plurality of admission control layers includes a service level layer configured to determine an admission permission or an admission rejection of the received connection request based on a service level agreement.

The admission control policy, i.e. the admission permission or admission rejection of a received connection request, may be, for example, based on maximizing network profit, maximizing performance cost ratio, maximizing the number of access users, or any combination of them, or any policy according to an SLA. In such embodiments, the service level layer determines the admission permission or the admission rejection of the received connection request based on a service level agreement.

Moreover, in some embodiments, the plurality of admission control layers includes a network level layer configured to determine an admission permission or an admission rejection of the received connection request based on a network situation.

In some embodiments, the network level admission control policy is adjusted and/or updated according to a current situation (network situation), for example, in a case where the network is becoming congested, the admission control policy may change from the maximization of network profit to a maximization of number of access users in order to keep the QoE acceptable. In a case of a natural disaster, for example, the admission control policy may be prone to prioritize access requests from key functional departments. In some embodiments, the admission control policy is adapted within the whole network (e.g. mobile telecommunications network which is part of the mobile telecommunications system), for example, the network is divided into different sub-networks with each sub-network applying different admission control policy, e.g. the urban area and rural area will apply different policy. In such embodiments, the network level layer determines the admission permission or the admission rejection of the received connection request based on a network situation.

Furthermore, in some embodiments, the plurality of admission control layers includes a user level layer configured to determine an admission permission or an admission rejection of the received connection request based on a user requirement.

In some embodiments, the admission permission or the admission rejection of the received connection request in the user level layer is based on network resources.

In some embodiments, the user level layer makes user specific policy according to different user requirement. Examples of user specific admission control policy are:

1) When current network resources are abundant:
   a) If the resources are enough to cover existing and future user equipment ("UE") and service requests, in some embodiments, all UEs with its on-going services will be accepted.
   b) If the resources are enough for on-going services, but may not be sufficient for the future UEs and their services, in some embodiments, certain resources are reserved for those future UEs with higher priority or services with higher priority. In such embodiments, the remaining resources will be partitioned among the requesting UEs and their services. For example, if an URLLC UE is expected to connect in the near future, the networks resources are freed from eMBB UEs in advance in some embodiments. In some embodiments, a RAN mobile telecommunications system implements the pre-emption feature with pre-emption criteria configured by the core network in terms of e.g. ARP ("Allocation and Retention Priority"). In such embodiments, low priority bearers are pre-empted in favor of high priority bearers.
2) When the current network resources are limited:
   a) UEs with higher priority and less resource hungry services will be accepted with higher probability in some embodiments.
   b) UEs with higher priority and resource hungry services will be accepted with medium probability in some embodiments.

c) UEs with low priority and less resource hungry services will be accepted with medium probability in some embodiments.

d) UEs with low priority and resource hungry services will be accepted with low probability in some embodiments.

3) When the current network resources are scarce, only the UEs or services with higher priority will be accepted in some embodiments.

High priority UE may be, for example, users who pay more subscription fee, users with higher user experience expectation (e.g. VR users), or the like.

High priority services may be, for example, emergency services, high QoS services, URLLC services, or the like.

Hence, in some embodiments, for abundant network resources for existing and future connections, the user level layer determines the admission permission of the received connection request with its on-going services.

Thus, in some embodiments, for abundant network resources for existing connections, the user level layer determines the admission permission of the received connection request for high priority connection requests.

Hence, in some embodiments, for limited network resources, the user level layer determines the ads mission permission of the received connection request for high priority connection requests demanding low network resources with high probability.

Thus, in some embodiments, for limited network resources, the user level layer determines the admission permission of the received connection request for high priority connection requests demanding high network resources with medium probability.

Hence, in some embodiments, for limited network resources, the user level layer determines the admission permission of the received connection request for low priority connection requests demanding low network resources with medium probability.

Thus, in some embodiments, for limited network resources, the user level layer determines the admission permission of the received connection request for low priority connection requests demanding high network resources with low probability.

Hence, in some embodiments, for scarce network resources, the user level layer determines the admission permission of the received connection request only for high priority connection requests.

As mentioned above, in some embodiments, an RRC connection or resume request is transmitted from a UE to a base station, i.e. network entity for a telecommunications system. In such embodiments, the network entity transmits an RRC setup or resume message to the UE whether a connection can be established and additionally including an admission control condition, which includes a timer indicating when the UE will be accepted to the network. For example, the timer can indicate a waiting time or a point of time, when the user will be permitted to transmit/receive data to/from network e.g. to be RRC_CONNECTED. In general, this approach can be extended for any procedure during the Idle/inactive state to RRC Connected mode state transition signaling procedure. It can also be extended to handling of the user plane data that a low priority UE should wait as new high priority service has been accepted and consuming resources. This may require temporary change of QoS requirements, i.e. discard timer value is increased temporarily.

Hence, in some embodiments, the circuitry of the network entity is further configured to transmit a radio resource control message in response to the received connection request including an admission permission condition.

It has further been recognized that machine learning ("ML") and/or artificial intelligence ("AI") is a powerful tool to learn, analyze and predict complex network scenarios, therefore machine learning may be integrated in wireless communications in some embodiments. The application of ML and/or Ai in wireless communications, i.e. mobile telecommunications system, may be categorized as follows in some embodiments:

First, in some embodiments, an application of ML in a wireless system is to exploit intelligent and predictive data analytics to enhance situational awareness and the overall network operations, such as fault monitoring, user tracking, or the like across the wireless network.

Second, in some embodiments, beyond its powerful, intelligent and predictive data analytics functions, ML is used as a major driver of intelligent and data-driven wireless network optimization in order to address a variety of problems ranging from cell association and radio access technology selection to frequency allocation, spectrum management, power control, intelligent beamforming and the like.

Third, as generally known, beyond its system level functions, ML plays a key role at the physical layer of a wireless network, such as in coding and modulation design, at both the transmitter and the receiver level within a generic communication system.

Fourth, in some embodiments, the rapid deployment of highly user-centric wireless services, such as VR, in which the gap between the end-user and the network functions is almost minimal, ML assists in wireless networks that can track and adapt to the human user behaviour.

Thus, it has been further recognized that the above-described multilayer admission control may be based on an output of a machine learning algorithm in order to provide the above-mentioned admission control requirements in various complex network situations.

Hence, some embodiments pertain to a network entity for a mobile telecommunications system, comprising circuitry configured to perform an admission control of a received connection request to the mobile telecommunications system, wherein the admission control is performed based on an output of a machine learning algorithm generated for a plurality of admission control layers.

As mentioned above, the network entity may be a base station, such as an eNodeB, a NR gNB, or the like as a part of the mobile telecommunications system, which may be based on UMTS, LTE, LTE-A, or an NR, 5G system or the like. The circuitry may include at least one of: a processor, a microprocessor, a dedicated circuit, a memory, a storage, a radio interface, a wireless interface, a network interface, or the like, e.g. typical electronic components which are included in a base station.

The machine learning algorithm may be or may include or may be based on a neural network, a decision tree, a support vector machine or the like generating an output which is used by the plurality of admission control layers in order to determine an admission permission or an admission rejection of the received connection request. The ML algorithm may be trained by supervised, unsupervised, reinforcement, deep learning strategies or the like. The ML algorithm may use historical network data in supervised and deep learning strategies. Generally, the output may include data which represents information which is used by the admission control. In the following, embodiments for different kinds of outputs are described (which can be each implemented alone or in any combination with each other). In some embodiments, the output includes a plurality of predictions and/or probabilities of, for example, (future) network traffic, (future) incoming UEs and services, (future) available resources and the like. In some embodiments, the output of the machine learning algorithm includes a prediction of future connection requests and their service requirements. In such embodiments, the ML algorithm can provide input for separate admission control algorithms (admission control layers). In some embodiments, the output includes connection restrictions, such as a type of restricted service, based on a monitoring of various network parameters, i.e. the ML algorithm calculates admission control criteria for the plurality of admission control layers. In some embodiments, the output of the machine learning algorithm includes generated admission control rules. In such is embodiments, the output includes a dynamically generated QoS policy and the policy is distributed to a PCRF ("Policy and Charging Rules Function") server.

The ML algorithm generates, in some embodiments, an optimum admission probability for each requesting UE and its services with a predetermined optimization goal, for example, in order to accommodate as many users as possible, to charge as much as possible, to maximize the user experience or the like.

In some embodiments, the plurality of admission control layers includes a service level layer configured to determine an admission permission or an admission rejection of the received connection request based on the output of the machine learning algorithm generated according to a service level agreement.

In such embodiments, the ML algorithm generates admission control policy according to an SLA or any contract with the user.

In some embodiments, the plurality of admission control layers includes a network level layer configured to determine an admission permission or an admission rejection of the received connection request based on the output of the machine learning algorithm generated according to a network situation.

In such embodiments, the ML algorithm makes or generates admission control policy according to a current (network) situation.

In some embodiments, the ML algorithm monitors, learns and identifies the current network situation in order to update or adjust the admission control policy according to a current situation, e.g. when the network is becoming congested the policy changes, for example, from maximizing network profit to maximizing the number of access users in order to keep the QoE acceptable.

Generally, the QoE evaluates the system performance using subjective and objective measures of customer satisfaction. In wireless networks, e.g. mobile telecommunications system, a plurality of factors is associated with the QoE, for example, the connection setup success rate, the handover success rate, the cost, the reliability, the throughput, the delay, and the like. Typically, it is difficult to find the correlation between these factors and the QoE.

Therefore, in some embodiments, the ML algorithm is trained with these (such) input values and an output is pre-labelled QoE from user poll. The poll may be executed by a request to the user to rate the connection and the satisfaction level after each connection. The user input may be used as the pre-labelled output of QoE and the monitored network parameters at the time of the connection may be used as input values to the ML algorithm in training stage.

In such embodiments, the ML algorithm manages to map the input data to the QoE output, thereby establishing a model to evaluate the QoE.

In some embodiments, the plurality of admission control layers includes a user level layer configured to determine an admission permission or an admission rejection of the received connection request based on the output of the machine learning algorithm generated according to a user requirement.

In such embodiments, the ML algorithm makes or generates user specific policy according to different user requirements.

As described above, examples of user specific admission control policy may be based on network resources, for example, when current resources are abundant, but the resources are enough only for on-going services, but may not be sufficient for the future UEs and their services, in some embodiments, certain resources are reserved for those future UEs with higher priority or services with higher priority. In such embodiments, the remaining resources will be partitioned among the requesting UEs and their services. For example, if an URLLC UE is expected to connect in the near future (which may be predicted and include a predetermined time interval, e.g. some seconds, minutes, hours, etc.), the networks resources are freed from eMBB UEs in advance in some embodiments. In some embodiments, a RAN mobile telecommunications system implements the pre-emption feature with pre-emption criteria configured by the core network in terms of e.g. ARP ("Allocation and Retention Priority"). In such embodiments, low priority bearers are pre-empted in favor of high priority bearers. In such embodiments, ML enables the RAN node to act in advance of the actual congestion scenario occurring in the network and still allowing high priority bearers to be accepted without delay.

The above-described examples are embodiments of rule based policy based on a ML output which optimizes the probability for accepting a connection request. In other embodiments, the ML algorithm generates rules together with human predetermined rules, i.e. predetermined admission control rules. Hence, in some embodiments, the admission control is performed further based on predetermined admission control rules.

In some embodiments, the ML algorithm generated rules are overridden by the predetermined rules, for example, in cases of unexpected results or results appearing to be against human's preferences.

In practical applications, there may be exceptional cases or situations where the ML algorithm generated rule may be irrelevant and, thus, the additional (human) predetermined admission control rules may override ML algorithm generated rules in such situations.

In some embodiments, the circuitry is further configured to transmit a radio resource control message in response to the received connection request including an admission permission condition based on the output of the machine learning algorithm.

As mentioned above, in some embodiments, an RRC connection or resume request is transmitted from a UE to a base station, i.e. network entity for a telecommunications system. In such embodiments, the network entity transmits an RRC setup or resume message to the UE whether a connection can be established and additionally including an admission control condition based on the output of the ML algorithm, which includes a timer indicating when the UE will be accepted to the network. The ML algorithm predicts any further user requests or service requests in order to enable the admission control to decide whether the connection control can be accepted or not (admission permission or rejection) based on the predictions. Additionally, in some embodiments, this procedure is applied to handover situations, where a RACH happens after a source network entity, i.e. base station, sends a handover request to a target network entity, i.e. base station, which acknowledges the handover and performs admission control of the connection request. In some embodiments, admission control is also performed when a new service/bearer is setup/modified for a UE already in RRC_Connected mode and other embodiments as described herein may also apply in such embodiments.

The ML algorithm may further predict the time how long a user will (or has to) wait to be accepted based on a network congestion level, available resources, potential contending UEs, user experience, and the like.

Hence, in some embodiments, the admission permission condition includes a timer indicative for a time (e.g. waiting time or point of time) when the connection request to the mobile telecommunications system will be accepted.

Additionally, the same timer is associated, in some embodiments, with those reserved resources in order to avoid a waste of resources. In such embodiments, those resources will be released, if no message is received after the timer has been expired.

Hence, in some embodiments, the circuitry is further configured to reserve network resources, and wherein the network resources are only upheld for the connection request to the mobile telecommunications system in case where a message is received after the timer has been expired.

In some embodiments, the above-described mechanism is applied to UEs in an RRC Connected mode in order to create temporarily sabbatical gaps in transmission and reception. In such embodiments, the UE can still stay in RRC Connected mode, but without any activity, thereby it helps to improve network congestion situation in the meantime. In such embodiments, the ARP parameter is modified to indicate if this bearer can be subjected to potential sabbatical gaps or delayed RRC resume procedure (there is no UE context in, for example, a gNB, i.e. network entity, for UEs in RRC_IDLE so (modified) ARP information is not available at the gNB). In such embodiments, the ML algorithm helps in admission control by predicting future coming UEs and their services and generates an optimum delay for some UEs according to the existing network overhead and requesting UEs and/or services.

Hence, in some embodiments, the circuitry is further configured to modify an allocation and retention priority parameter for indication of a user equipment which can be subjected to transmission and reception gaps or a delayed radio resource control resume procedure.

An implementation of this delayed admission control procedure may save duplicate RACH attempts. The difference with a backoff indicator (which is generally known) is, for example, that with the backoff indicator, the users will be randomized to re-initiate the RACH. However, the network cannot control the UEs precisely, in particular, when and which UE will initiate the RACH. With the delayed admission control procedure, as described above, in some embodiments, the network can (precisely) control each specific UE to access the network within a predetermined time. As mentioned above, this may be based on a prediction of the future network traffic, number of potential access UEs, and the like.

In summary, in some embodiments, a Conditional RRC connection and resume request setup and/or a creation of traffic gaps in a RRC Connected mode including an admission permission condition is included in the message from a network entity, e.g. a gNB, to a UE to indicate when the UE will be actually transit to RRC Connected or is allowed to start transmission.

In some embodiments, the machine learning algorithm includes a neural network including an input layer, an intermediate layer including weights and an output layer, and wherein the output of the machine learning algorithm is based on an output of the output layer.

In some embodiments, the neural network includes a loss function.

Generally, and, thus, in some embodiments, (artificial) neural networks are organized into multiple layers, wherein each layer includes one or more nodes and wherein each node in one layer is connected to nodes in an immediately preceding and following layer. The layer that receives external data (input) is the input layer and the layer that produces the results and/or predictions (output) is the output layer. In between is an intermediate layer including one or more hidden layers. Each connection between the nodes is assigned with a weight. A trained neural network may be characterized by the trained weights in some embodiments.

In some embodiments, the loss function is used in the training stage (update of weights) of the neural network and may represent a cost function, which measures the difference in an output of the output layer and a desired (actual) output given by the training data (here e.g. obtained from historical network data or via user poll for QoE). The weights may be adjusted in training stage to map the input to the output by minimizing the cost function, wherein typically the back-propagation algorithm is applied.

In some embodiments, the neural network is trained with historical input values and the neural network provides output and compares the output with the actual result in the stored historical output values. If there is a deviation between them, the loss function calculates the error and updates the weights of the neural network based on the deviation.

In some embodiments, the training process is deployed inside a network entity (e.g. base station or the like) as described herein, including electronic components (circuitry) which are typically used for a training process a ML algorithm, i.e. neural network, such as a memory, a microprocessor, a graphical processing unit, or the like. In other embodiments the training process is deployed inside an external server/tool for network operation and maintenance (O&M). In some embodiments, the training process is handled offline. In other embodiments, the training process is handled during live network operation, wherein the server includes enough memory to store the historical (training) data. In some embodiments, the raw data of the network (historical data) is too large to store on a memory inside the network entity or the server. In such embodiments, the data is processed in advance of the training process, for example, by averaging or the like in order to reduce the size.

In some embodiments, the trained ML algorithm, e.g. neural network having trained weights, is deployed for inference (actual operation for admission control) in the network entity. In such embodiments, the input to the ML algorithm, e.g. the neural network, is actual (real-time) data from live network monitoring and some static configurations. The ML algorithm provides, for example, the prediction of available resources and the outputs are sent to the admission controller, i.e. the admission control layers, which decides on admission control and send the signalling to a network control plane (AMF/RRM "Access and Mobility Management Function"/"Radio Resource Management").

As a result, new call/traffic may be restricted. If, for example, the ML algorithm outputs unexpected results or something wrong, the admission controller may override it with rule-based policy by predetermined admission control rules.

In general, an advantage of ML is, especially deep learning and neural networks, that ML finds the relevant input among many input parameters. In that sense, any type of input may be fine. However, in some embodiments, it needs additional costs (e.g. a large number of nodes, layers, etc.). Therefore, in such embodiments, irrelevant inputs are excluded based on human preferences and criteria, for example, when humans think that some input parameters are irrelevant.

Generally, the larger number of (hidden) layers may provide more accurate predictions. However, it takes additional cost of training time, processing load, and power consumption. Thus, there is a trade-off between prediction accuracy and cost. The intermediate layer (including the hidden layers) of the neural network may be optimized based on the number on input and output parameters and the gap between prediction results and actual results.

The present disclosure determines decision criteria of admission control among many input parameters without degradation of QoE, resource shortage, resource loss and the like. As mentioned above, this may be based on the prediction of, for example, QoE development in the near future in addition to the current situation generated from a trained neural network for a plurality of admission control layers.

Thus, as examples, the neural network takes the following inputs and provides the following outputs in some embodiments:

Examples of inputs:

a) High-level policy/circumstances:
   - A normal or a special case such as a natural disaster.
   - A government regulation on mobile telecommunications provider.

b) Operator's commercial policy:
   - Prioritization of VIPs ("Very Important Persons") or high-end service having a price.
   - Flat rate tariff (or no extra charge) for a specific service or application.
   - Promotion campaign for a new terminal launch or a new service.

c) Physical parameters:
   - Historical data network data.
   - Traffic related input such as the number of users, the traffic per user or overflow calls.
   - Service related input such as the type of service and its request, the required QoS of the service or the relation between QoS and QoE.
   - Physical resources such as power headroom of the base station (i.e. network entity), interferences, baseband processing load/channel capacity, usage of backhaul/fronthaul bandwidth, or the network key performance indicator related to physical resource usage (e.g. setup success rate).

Examples of outputs:

a) Connection restrictions, if ML algorithm directly generates admission control for the admission control layers: time/date of restriction start, location of restriction start, type of restricted services, restricted users and network actions for these users, or criteria of ending these restrictions.

b) Predictions about the future (time) and in specific location (cell coverage/zone/area) for the admission control layers: the available resources, the number of users, the service usage, the traffic load, the interference, the power headroom of the base station, the baseband processing load, or the usage of backhaul/fronthaul bandwidth.

c) Generated QoS policy for distribution to PCRF server: QoS rule and admission criteria.

In order to optimize the neural network (the weights) the loss function may be based on the following examples:

a) QoE and/or QoS degradation based: The loss function measures the difference between required QoE and/or QoS and offered QoE and/or QoS, i.e. the gap is related to a customer's frustration or a breach of service level agreements.

b) Traffic load based: The loss function measures the difference between the offered traffic (required to send) and the carried traffic (actually send), i.e. the gap is related to an overflow traffic which has not been carried.

c) Available resource based: The loss function measures the difference between an estimated resource and an actual resource. The gap is related to a resource shortage (or overestimated).

d) Business requirement based: The loss function measures the difference between an expected revenue and an actual revenue. The gap is related to additional profits.

In some embodiments, the output of the output layer of the neural network includes a plurality of connection restrictions.

In some embodiments, the plurality of connection restrictions includes a timing of a restriction start.

In some embodiments, the plurality of connection restrictions includes a location of a restriction start.

In some embodiments, the plurality of connection restrictions includes a type of restricted services.

In some embodiments, the plurality of connection restrictions includes restricted users and network actions for these users.

In some embodiments, the plurality of connection restrictions includes criteria of a restriction end.

In some embodiments, the output of the output layer of the neural network includes a plurality of predicted network situation indicators indicative for a future time and a location.

In some embodiments, the plurality of predicted network situation indicators includes predicted available resources.

In some embodiments, the plurality of predicted network situation indicators includes predicted number of users.

In some embodiments, the plurality of predicted network situation indicators includes predicted service usage.

In some embodiments, the plurality of predicted network situation indicators includes predicted traffic load.

In some embodiments, the plurality of predicted network situation indicators includes predicted interference.

In some embodiments, the plurality of predicted network situation indicators includes predicted power headroom of a base station.

In some embodiments, the plurality of predicted network situation indicators includes predicted baseband processing load.

In some embodiments, the plurality of predicted network situation indicators includes predicted usage of backhaul and/or fronthaul bandwidth.

In some embodiments, the output of the output layer of the neural network includes a quality of service admission control rule.

In some embodiments, the input of the input layer includes a plurality of high-level circumstances.

In some embodiments, the plurality of high level circumstances includes a normal and/or a special circumstance policy.

In some embodiments, the plurality of high level circumstances includes a government regulation on mobile telecommunications services.

In some embodiments, the input of the input layer includes a plurality of operator rules.

In some embodiments, the plurality of operator rules includes a prioritization of predetermined persons and/or of high-end services with predetermined prices.

In some embodiments, the plurality of operator rules includes a flat rate tariff for a specific service and/or application.

In some embodiments, the plurality of operator rules includes a promotion campaign for new terminal launch and/or service launch.

In some embodiments, the input of the input layer includes a plurality of physical network parameters.

In some embodiments, the plurality of physical network parameters includes historical and current physical network parameters.

In some embodiments, the plurality of physical network parameters includes a number of users.

In some embodiments, the plurality of physical network parameters includes a traffic per user.

In some embodiments, the plurality of physical network parameters includes overflow calls.

In some embodiments, the plurality of physical network parameters includes a type of service and request.

In some embodiments, the plurality of physical network parameters includes a required quality of service.

In some embodiments, the plurality of physical network parameters includes a relation between the quality of service and a quality of user experience.

In some embodiments, the plurality of physical network parameters includes a power headroom of a base station.

In some embodiments, the plurality of physical network parameters includes interferences.

In some embodiments, the plurality of physical network parameters includes a baseband processing load and/or channel capacity.

In some embodiments, the plurality of physical network parameters includes a usage of backhaul and/or fronthaul bandwidth.

In some embodiments, the plurality of physical network parameters includes a network key performance indicator related to physical resource usage.

In some embodiments, the loss function is based on the difference between a required quality of service and/or a required quality of experience and an offered quality of service and/or an offered quality of experience.

In some embodiments, the loss function is based on the difference between an ordered traffic and a carried traffic.

In some embodiments, the loss function is based on the difference between estimated network resources and current network resources.

In some embodiments, the loss function is based on the difference between an expected revenue and a current revenue.

In some embodiments, the output of the output layer is overridden by predetermined admission control rules in case of unexpected results and/or in case of results against predetermined preferences.

In some embodiments, the weights of the intermediate layer are trained based on historical training data.

In some embodiments, the weights of the intermediate layer are trained offline and/or during operation.

In some embodiments, the weights of the intermediate layer are trained inside a base station and/or an external server for network operation and maintenance.

In some embodiments, the historical data is preprocessed.

In some embodiments, the weights of the intermediate layer are trained for an evaluation of a quality of user experience, and wherein the weights are trained based on user input values corresponding to a rating of a connection quality to the mobile telecommunications system as an output of user experience training data.

In some embodiments, an input of the user experience training data includes a connection setup success rate.

In some embodiments, an input of the user experience training data includes a handover success rate.

In some embodiments, an input of the user experience training data includes a connection cost.

In some embodiments, an input of the user experience training data includes a connection reliability.

In some embodiments, an input of the user experience training data includes a connection throughput.

In some embodiments, an input of the user experience training data includes a connection delay.

Some embodiments pertain to a user equipment for a mobile telecommunications system, comprising circuitry configured to receive a radio resource control message in response to the connection request to the mobile telecommunications system including an admission permission condition based on an output of a machine learning algorithm, as discussed above.

The user equipment may be or may include a smartphone, a VR device, a laptop or the like. The circuitry may include at least one of: a processor, a microprocessor, a dedicated circuit, a memory, a storage, a radio interface, a wireless interface, a network interface, or the like, e.g. typical electronic components which are included in a user equipment to achieve the functions as described herein.

In some embodiments, the admission permission condition includes a timer indicative for a time when the connection request to the mobile telecommunications system will be accepted, as discussed above.

In some embodiments, the circuitry is further configured to transmit a user input value corresponding to a rating of a connection quality to the mobile telecommunications system, as discussed above.

In some embodiments, a network entity as described herein and a user equipment as described herein constitute an admission control system and/or are part of a mobile telecommunications system (network).

Some embodiments pertain to a method for performing an admission control of a received connection request to a mobile telecommunications system, the method including:

performing the admission control based on a plurality of admission control layers.

The method may include any further steps as discussed herein for the network entity and for the user equipment.

Some embodiments pertain to a method for performing an admission control of a received connection request to a mobile telecommunications system, the method including:

performing the admission control based on an output of a machine learning algorithm generated for a plurality of admission control layers.

The method may include any further steps as discussed herein for the network entity and for the user equipment.

The methods as described herein are also implemented in some embodiments as a computer program causing a computer and/or a processor to perform the method, when being carried out on the computer and/or processor. In some embodiments, also a non-transitory computer-readable recording medium is provided that stores therein a computer program product, which, when executed by a processor, such as the processor described above, causes the methods described herein to be performed.

Returning to FIG. 2, an embodiment of a delayed radio resource control connection setup sequence is illustrated.

At 10 the UE 6 transmits a random access request including an RRC connection set up request to a network entity (NE) 7, which is in this embodiment a gNB, via RACH. In this embodiment, it is a contention-based RACH. The NE 7 checks the establishment cause and according to an ML algorithm, in this embodiment a trained neural network deployed in the network entity 7 (as discussed above), based prediction of any further user requests or service requests, the network entity 7 determines an admission permission or admission rejection, i.e. whether the connection control can be accepted or not (as discussed herein).

If the received connection request cannot be accepted at the moment, the network entity 7 sends at 11 an RRC setup message including an admission permission condition. In this embodiment, the admission permission condition includes a timer indicative for a (future) time when the setup procedure can be accepted (as discussed herein). The timer, i.e. the amount of time the UE 6 will wait until the UE 6 is accepted, depends on predicted network congestion level, available resources, potential contending UEs, the user expectation, etc. being output from the trained ML algorithm. In the meantime, the network entity 7 upholds network resources for the received connection request, which will be released, if no message is received from the UE 6 after the timer has been expired.

After the above conditions are fulfilled and the UE 6 moves to the RRC Connected mode, the UE 6 acknowledges at 12 the receipt of the setup message.

Figure 3:
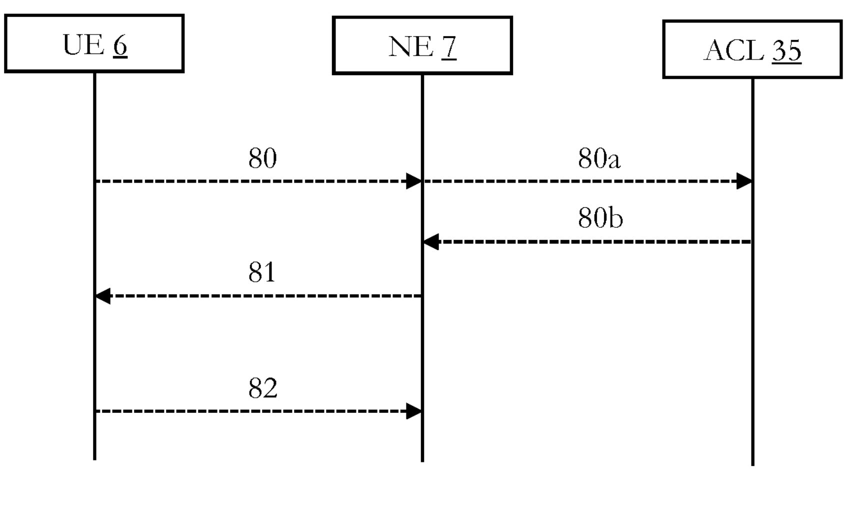
FIG. 3 illustrates a first embodiment of an admission control performed by a network entity.

FIG. 3 illustrates a first embodiment of an admission control performed by a network entity 7.

At 80 the UE 6 transmits a connection request to the NE 7. The NE 7 includes an admission controller (ACL) 35 (for illustration purposes depicted as separate unit) including a plurality of admission control layers, here: a service level layer, a network level layer and a user level layer (as discussed herein). The ACL 35 (being part of the NE 7) takes at **80*a* the received connection request and performs the admission control based on the plurality of admission control layers (as discussed herein). The ACL 35 determines an admission permission or admission rejection of the received connection request based on a service level agreement, a network situation and a user requirement (as discussed herein). In this embodiment, the ACL 35 determines an admission permission at 80*b*. The NE 7 transmits at 81 the admission permission to the UE 6, which acknowledges at 82** its receipt and connects to the mobile telecommunications system.

In another embodiment, the NE 7 transmits at 81 an RRC setup message including an admission permission condition. In such an embodiment, the admission permission condition includes a timer indicative for a (future) time when the setup procedure can be accepted (as discussed herein). The timer, i.e. the amount of time the UE 6 will wait until the UE 6 is accepted. In the meantime, the NE 7 upholds network resources for the received connection request, which will be released, if no message is received from the UE 6 after the timer has been expired. After the above conditions are fulfilled and the UE 6 moves to the RRC Connected mode, the UE 6 acknowledges at 82 the receipt of the setup message.

Figure 4:
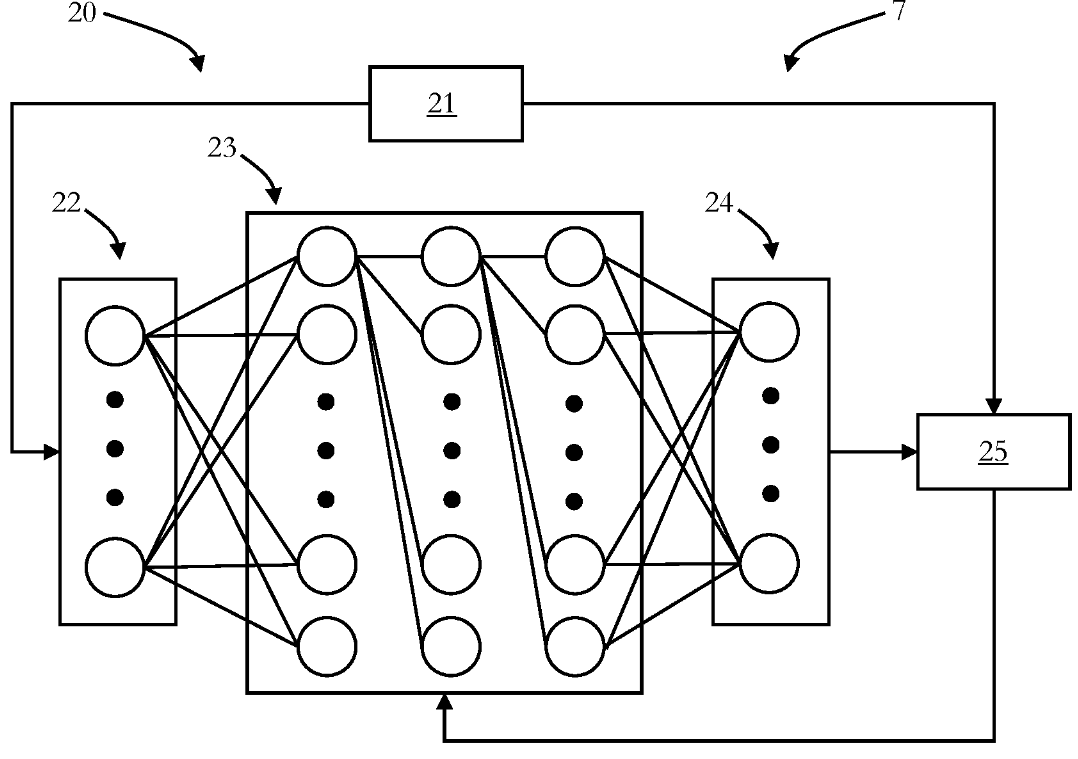
FIG. 4 illustrates in a block diagram an embodiment of a neural network in a training stage.

FIG. 4 illustrates in a block diagram an embodiment of a neural network 20 in a training stage.

In this embodiment, the neural network 20 in the training stage is deployed in the network entity 7 and obtains input from a data storage device including historical data 21 at an input layer 22. In this embodiment, the input includes a plurality of (historical) high-level circumstances, a plurality of (historical) operator rules and includes a plurality of (historical) physical network parameters, as described above.

The nodes of the input layer 22 are connected to first nodes of an intermediate layer 23. The intermediate layer 23 performs calculations and the last nodes are connected to an output layer, which outputs predictions of the actual results. In this embodiment, the output includes a plurality of connection restrictions, a plurality of predicted network situation indicators and a quality of service admission control rule, as described above.

A loss function 25 compares the predicted result with the actual results obtained from the stored historical data 21 and uses a backpropagation algorithm to update the weights of the neural network 20 in order to increase the prediction accuracy of the neural network 20.

Figure 5:
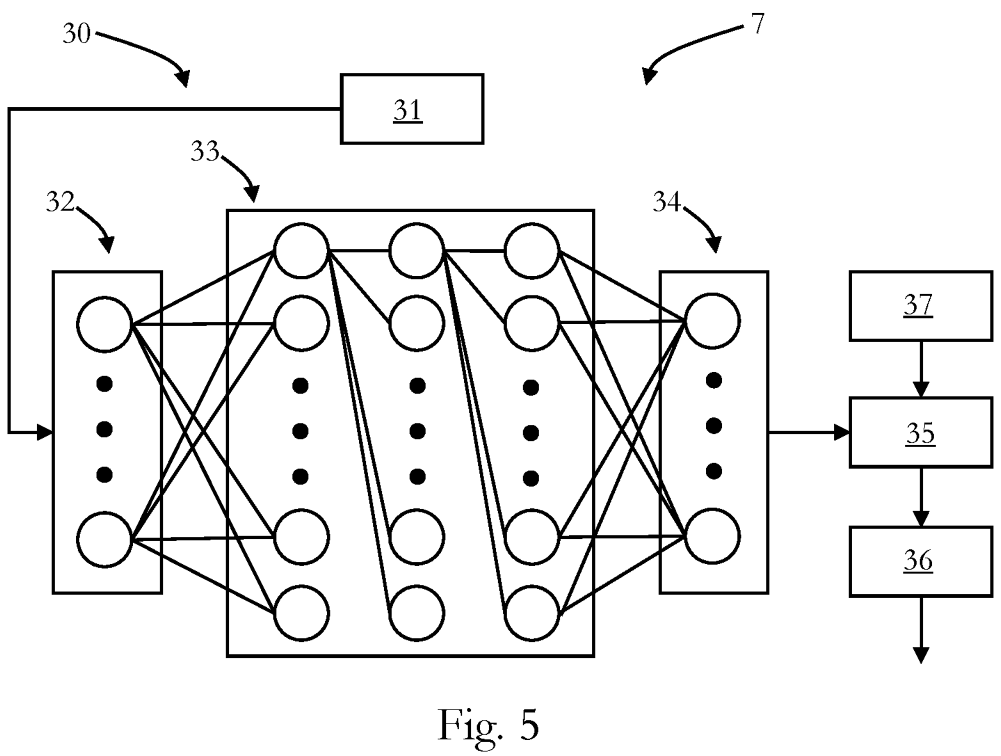
FIG. 5 illustrates in a block diagram an embodiment of a neural network in an inference stage.

FIG. 5 illustrates in a block diagram an embodiment of a neural network 30 in an inference stage.

The neural network 30 corresponds to the trained neural network 20 of FIG. 3 and is deployed in the network entity 7 for inferencing, wherein the input layer 32, the intermediate layer 33 and the output layer 34 have the same structure as in FIG. 3. The neural network 30 obtains actual (real-time) data 31 and outputs the predictions to an admission controller 35 including three admission control layers: a service level layer, a network level layer and a user level layer. The admission controller 35 determines an admission permission or admission rejection and sends the signaling to a network control plane (AMF/RRM) 36. As a result, a new call or traffic is restricted.

In the case of unexpected results the admission controller includes predetermined admission control rules 37 and overrides the output of the neural network 30 with the predetermined admission control rules.

Figure 6:
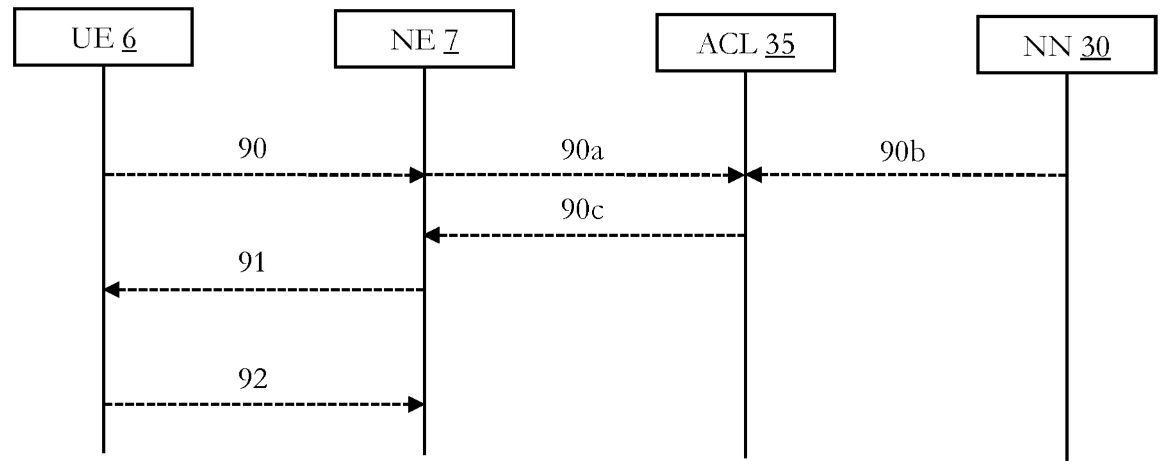
FIG. 6 illustrates a second embodiment of an admission control performed by a network entity.

FIG. 6 illustrates a second embodiment of an admission control performed by a network entity 7.

At 90 the UE 6 transmits a connection request to the NE 7. The NE 7 includes the admission controller (ACL) 35 (for illustration purposes depicted as separate unit) from FIG. 5 including a plurality of admission control layers, here: a service level layer, a network level layer and a user level layer (as discussed herein). The ACL 35 (being part of the NE 7) takes at **90*a* the received connection request and performs the admission control based on an output of a ML algorithm, here the trained neural network (NN) 30 from FIG. 5, generated at 90*b* for the plurality of admission control layers (as discussed herein). The ACL 35 determines an admission permission or admission rejection of the received connection request based on the output of the NN 30 (ML algorithm) generated according to a service level agreement, a network situation and a user requirement (as discussed herein). In this embodiment, the ACL 35 determines an admission permission at 90*c*. The NE 7 transmits at 91 the admission permission to the UE 6, which acknowledges at 92** its receipt and connects to the mobile telecommunications system.

Figure 7:
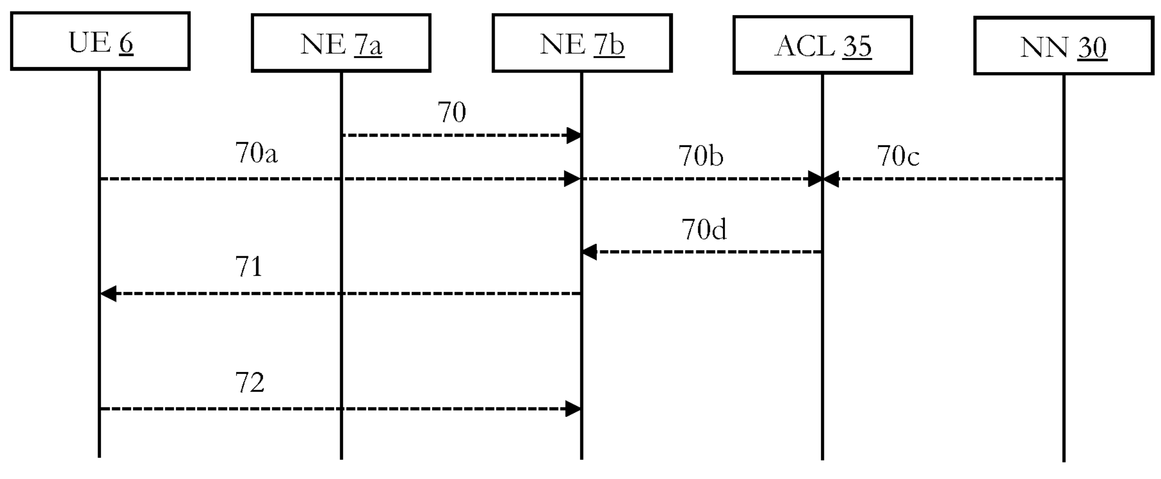
FIG. 7 illustrates a third embodiment of an admission control performed by a network entity in a handover situation.

FIG. 7 illustrates a third embodiment of an admission control performed by a network entity 7*b* in a handover situation.

At 70 the source network entity NE 7*a* sends a handover request to the target network entity 7*b*, which acknowledges the handover. At 70*a* the UE 6 transmits a connection request to the target NE 7*b*. The target NE 7*b* includes the admission controller (ACL) 35 (for illustration purposes depicted as separate unit) from FIG. 5 including a plurality of admission control layers, here: a service level layer, a network level layer and a user level layer (as discussed herein). The ACL 35 (being part of the target NE 7*b*) takes at 70*b* the received connection request and performs the admission control based on an output of a ML algorithm, here the trained neural network (NN) 30 from FIG. 5, generated at 70*c* for the plurality of admission control layers (as discussed herein). The ACL 35 determines an admission permission or admission rejection of the received connection request based on the output of the NN 30 (ML algorithm) generated according to a service level agreement, a nets work situation and a user requirement (as discussed herein). In this embodiment, the ACL 35 determines an admission permission at 70*d*. The target NE 7*b* transmits at 71 the admission permission to the UE 6, which acknowledges at 72 its receipt and connects to the mobile telecommunications system via the target NE 7*b*.

Figure 8:
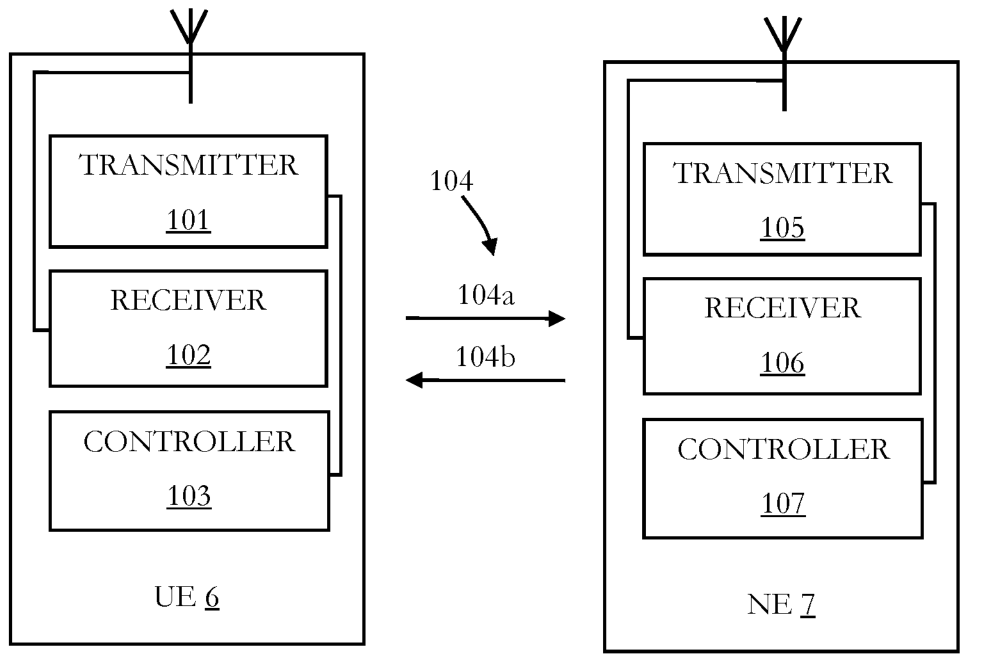
FIG. 8 illustrates a user equipment and a network entity.

An embodiment of a UE 6 and a network entity (NE) 7 (e.g. NR eNB/gNB) and a communication 104 between the UE 6 and the NE 7, which are used for implementing embodiments of the present disclosure, is discussed under reference of FIG. 8.

The UE 6 has a transmitter 101, a receiver 102 and a controller 103, wherein, generally, the technical functionality of the transmitter 101, the receiver 102 and the controller 103 are known to the skilled person, and, thus, a more detailed description of them is omitted.

The NE 7 has a transmitter 105, a receiver 106 and a controller 107, wherein also here, generally, the functionality of the transmitter 105, the receiver 106 and the controller 107 are known to the skilled person, and, thus, a more detailed description of them is omitted.

The communication path 104 has an uplink path 104*a*, which is from the UE 6 to the NE 7, and a downlink path 104*b*, which is from the NE 7 to the UE 6.

During operation, the controller 103 of the UE 6 controls the reception of downlink signals over the downlink path 104*b* at the receiver 102 and the controller 103 controls the transmission of uplink signals over the uplink path 104*a* via the transmitter 101.

Similarly, during operation, the controller 107 of the NE 7 controls the transmission of downlink signals over the downlink path 104*b* over the transmitter 105 and the controller 107 controls the reception of uplink signals over the uplink path 104*a* at the receiver 106.

Figure 9:
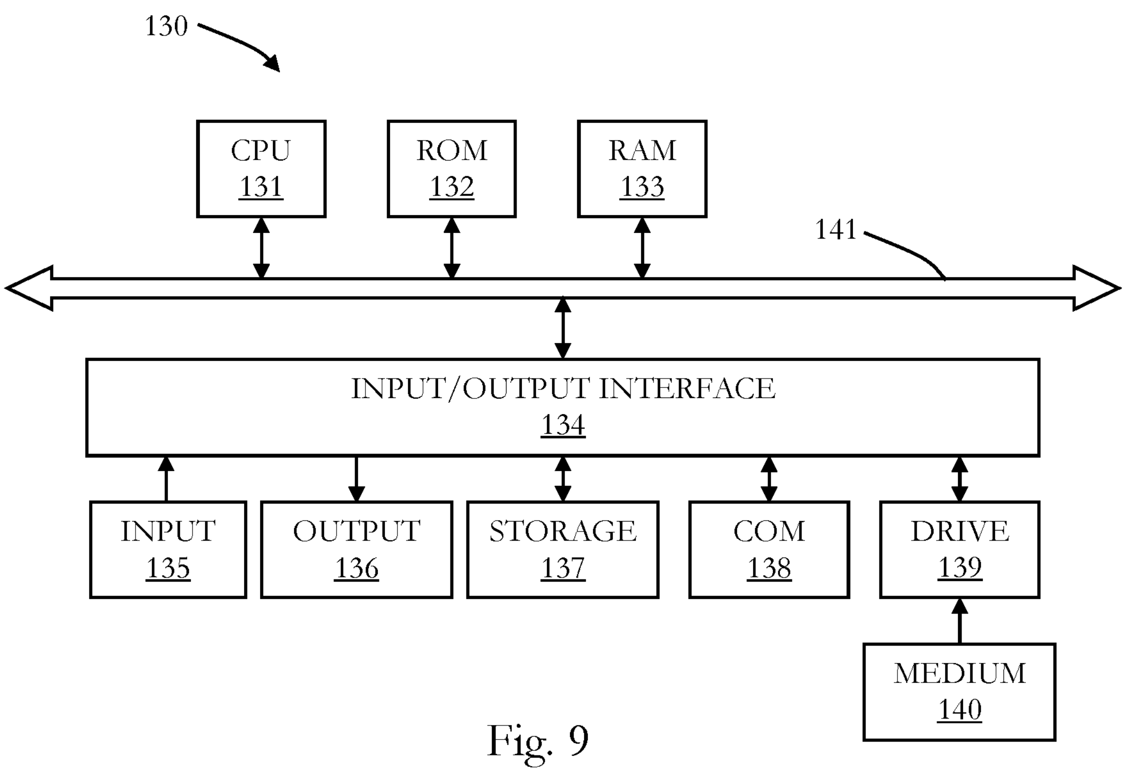
FIG. 9 illustrates a multi-purpose computer which can be used for implementing a user equipment or a network entity.

In the following, an embodiment of a general purpose computer 130 is described under reference of FIG. 9.

The computer 130 can be implemented such that it can basically function as any type of network entity, base station or new radio base station, transmission and reception point, or user equipment as described herein. The computer has components 131 to 141, which can form a circuitry, such as any one of the circuitries of the base stations, and user equipments, as described herein.

Embodiments which use software, firmware, programs or the like for performing the methods as described herein can be installed on computer 130, which is then configured to be suitable for the concrete embodiment.

The computer 130 has a CPU 131 (Central Processing Unit), which can execute various types of procedures and methods as described herein, for example, in accordance with programs stored in a read-only memory (ROM) 132, stored in a storage 137 and loaded into a random access memory (RAM) 133, stored on a medium 140 which can be inserted in a respective drive 139, etc.

The CPU 131, the ROM 132 and the RAM 133 are connected with a bus 141, which in turn is connected to an input/output interface 134. The number of CPUs, memories and storages is only exemplary, and the skilled person will appreciate that the computer 130 can be adapted and configured accordingly for meeting specific requirements which arise, when it functions as a base station or as user equipment.

At the input/output interface 134, several components are connected: an input 135, an output 136, the storage 137, a communication interface 138 and the drive 139, into which a medium 140 (compact disc, digital video disc, compact flash memory, or the like) can be inserted.

The input 135 can be a pointer device (mouse, graphic table, or the like), a keyboard, a microphone, a camera, a touchscreen, etc.

The output 136 can have a display (liquid crystal display, cathode ray tube display, light emittance diode display, etc.), loudspeakers, etc.

The storage 137 can have a hard disk, a solid state drive and the like.

The communication interface 138 can be adapted to communicate, for example, via a local area network (LAN), wireless local area network (WLAN), mobile telecommunications system (GSM, UMTS, LTE, NR etc.), Bluetooth, infrared, etc.

It should be noted that the description above only pertains to an example configuration of computer 130. Alternative configurations may be implemented with additional or other sensors, storage devices, interfaces or the like. For example, the communication interface 138 may support other radio access technologies than the mentioned UMTS, LTE and NR.

When the computer 130 functions as a base station, the communication interface 138 can further have a respective air interface (providing e.g. E-UTRA protocols OFDMA (downlink) and SCFDMA (uplink)) and network interfaces (implementing for example protocols such as S1-AP, GTPU, S1-MME, X2-AP, or the like). Moreover, the computer 130 may have one or more antennas and/or an antenna array. The present disclosure is not limited to any particularities of such protocols.

Figure 10:
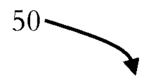
FIG. 10 illustrates in a flow chart a first embodiment of a method for performing an admission control.

FIG. 10 illustrates in a flow chart a first embodiment of a method 50 for performing an admission control.

At 51, the admission control is performed based on a plurality of admission control layers, as discussed herein.

Figure 11:
FIG. 11 illustrates in a flow chart a second embodiment of a method for performing an admission control.

FIG. 11 illustrates in a flow chart a second embodiment of a method 60 for performing an admission control.

At 61, the admission control is performed based on an output of a machine learning algorithm generated for a plurality of admission control layers, as discussed herein.

All units and entities described in this specification and claimed in the appended claims can, if not stated otherwise, be implemented as integrated circuit logic, for example on a chip, and functionality provided by such units and entities can, if not stated otherwise, be implemented by software.

In so far as the embodiments of the disclosure described above are implemented, at least in part, using software-controlled data processing apparatus, it will be appreciated that a computer program providing such software control and a transmission, storage or other medium by which such a computer program is provided are envisaged as aspects of the present disclosure.

Note that the present technology can also be configured as described below.

(1) A network entity for a mobile telecommunications system, comprising circuitry configured to perform an admission control of a received connection request to the mobile telecommunications system, wherein the admission control is performed based on a plurality of admission control layers.

(2) The network entity of (1), wherein the plurality of admission control layers includes a service level layer configured to determine an admission permission or an admission rejection of the received connection request based on a service level agreement.

(3) The network entity of (1) or (2), wherein the plurality of admission control layers includes a network level layer configured to determine an admission permission or an admission rejection of the received connection request based on a network situation.

(4) The network entity of anyone of (1) to (3), wherein the plurality of admission control layers includes a user level layer configured to determine an admission permission or an admission rejection of the received connection request based on a user requirement.

(5) The network entity of anyone of (1) to (4), wherein the circuitry is further configured to transmit a radio resource control message in response to the received connection request including an admission permission condition.

(6) The network entity of (4) or (5), wherein the determination of the admission permission or the admission rejection of the received connection request in the user level layer is based on network resources.

(7) The network entity of (6), wherein for abundant network resources for existing and future connections, the user level layer determines the admission permission of the received connection request with its on-going services.

(8) The network entity of (6) or (7), wherein for abundant network resources for existing connections, the user level layer determines the admission permission of the received connection request for high priority connection requests.

(9) The network entity of anyone of (6) to (8), wherein for limited network resources, the user level layer determines the admission permission of the received connection request for high priority connection requests demanding low network resources with high probability.

(10) The network entity of anyone of (6) to (9), wherein for limited network resources, the user level layer determines the admission permission of the received connection request for high priority connection requests demanding high network resources with medium probability.

(11) The network entity of anyone of (6) to (10), wherein for limited network resources, the user level layer determines the admission permission of the received connection request for low priority connection requests demanding low network resources with medium probability.

(12) The network entity of anyone of (6) to (11), wherein for limited network resources, the user level layer determines the admission permission of the received connection request for low priority connection requests demanding high network resources with low probability.

(13) The network entity of anyone of (6) to (12), wherein for scarce network resources, the user level layer determines the admission permission of the received connection request only for high priority connection requests.

(14) A network entity for a mobile telecommunications system, comprising circuitry configured to perform an admission control of a received connection request to the mobile telecommunications system, wherein the admission control is performed based on an output of a machine learning algorithm generated for a plurality of admission control layers.

(15) The network entity of (14), wherein the plurality of admission control layers includes a service level layer configured to determine an admission permission or an admission rejection of the received connection request based on the output of the machine learning algorithm generated according to a service level agreement.

(16) The network entity of (14) or (15), wherein the plurality of admission control layers includes a network level layer configured to determine an admission permission or an admission rejection of the received connection request based on the output of the machine learning algorithm generated according to a network situation.

(17) The network entity of anyone of (14) to (16), wherein the plurality of admission control layers includes a user level layer configured to determine an admission permission or an admission rejection of the received connection request based on the output of the machine learning algorithm generated according to a user requirement.

(18) The network entity of anyone of (14) to (17), wherein the circuitry is further configured to transmit a radio resource control message in response to the received connection request including an admission permission condition based on the output of the machine learning algorithm.

(19) The network entity of (18), wherein the admission permission condition includes a timer indicative for a time when the connection request to the mobile telecommunications system will be accepted.

(20) The network entity of (19), wherein the circuitry is further configured to reserve network resources, and wherein the network resources are only upheld for the connection request to the mobile telecommunications system in case where a message is received after the timer has been expired.

(21) The network entity of anyone of (18) to (20), wherein the circuitry is further configured to modify an allocation and retention priority parameter for indication of a user equipment which can be subjected to transmission and reception gaps or a delayed radio resource control resume procedure.

(22) The network entity of anyone of (14) to (21), wherein the output of the machine learning algorithm includes a prediction of future connection requests and their service requirements.

(23) The network entity of anyone of (14) to (22), wherein the output of the machine learning algorithm includes generated admission control rules.

(24) The network entity of (23), wherein the admission control is performed further based on predetermined admission control rules.

(25) The network entity of anyone of (14) to (24), wherein the machine learning algorithm includes a neural network including an input layer, an intermediate layer including weights and an output layer, and wherein the output of the machine learning algorithm is based on an output of the output layer.

(26) The network entity of (25), wherein the neural network includes a loss function.

(27) The network entity of (25) or (26), wherein the output of the output layer of the neural network includes a plurality of connection restrictions.

(28) The network entity of (27), wherein the plurality of connection restrictions includes a timing of a restriction start.

(29) The network entity of (27) or (28), wherein the plurality of connection restrictions includes a location of a restriction start.

(30) The network entity of anyone of (27) to (29), wherein the plurality of connection restrictions includes a type of restricted services.

(31) The network entity of anyone of (27) to (30), wherein the plurality of connection restrictions includes restricted users and network actions for these users.

(32) The network entity of anyone of (27) to (31), wherein the plurality of connection restrictions includes criteria of a restriction end.

(33) The network entity of anyone of (25) to (32), wherein the output of the output layer of the neural network includes a plurality of predicted network situation indicators indicative for a future time and a location.

(34) The network entity of (33), wherein the plurality of predicted network situation indicators includes predicted available resources.

(35) The network entity of (33) or (34), wherein the plurality of predicted network situation indicators includes predicted number of users.

(36) The network entity of anyone of (33) to (35), wherein the plurality of predicted network situation indicators includes predicted service usage.

(37) The network entity of anyone of (33) to (36), wherein the plurality of predicted network situation indicators includes predicted traffic load.

(38) The network entity of anyone of (33) to (37), wherein the plurality of predicted network situation indicators includes predicted interference.

(39) The network entity of anyone of (33) to (38), wherein the plurality of predicted network situation indicators includes predicted power headroom of a base station.

(40) The network entity of anyone of (33) to (39), wherein the plurality of predicted network situation indicators includes predicted baseband processing load.

(41) The network entity of anyone of (33) to (40), wherein the plurality of predicted network situation indicators includes predicted usage of backhaul and/or fronthaul bandwidth.

(42) The network entity of anyone of (25) to (41), wherein the output of the output layer of the neural network includes a quality of service admission control rule.

(43) The network entity of anyone of (25) to (42), wherein the input of the input layer includes a plurality of high-level circumstances.

(44) The network entity of (43), wherein the plurality of high level circumstances includes a normal and/or a special circumstance policy.

(45) The network entity of (43) or (44), wherein the plurality of high level circumstances includes a government regulation on mobile telecommunications services.

(46) The network entity of anyone of (25) to (45), wherein the input of the input layer includes a plurality of operator rules.

(47) The network entity of (46), wherein the plurality of operator rules includes a prioritization of predetermined persons and/or of high-end services with predetermined prices.

(48) The network entity of (46) or (47), wherein the plurality of operator rules includes a flat rate tariff for a specific service and/or application.

(49) The network entity of anyone of (46) to (48), wherein the plurality of operator rules includes a promotion campaign for new terminal launch and/or service launch.

(50) The network entity of anyone of (25) to (49), wherein the input of the input layer includes a plurality of physical network parameters.

(51) The network entity of (50), wherein the plurality of physical network parameters includes historical and current physical network parameters.

(52) The network entity of (50) or (51), wherein the plurality of physical network parameters includes a number of users.

(53) The network entity of anyone of (50) to (52), wherein the plurality of physical network parameters includes a traffic per user.

(54) The network entity of anyone of (50) to (53), wherein the plurality of physical network parameters includes overflow calls.

(55) The network entity of anyone of (50) to (54), wherein the plurality of physical network parameters includes a type of service and request.

(56) The network entity of anyone of (50) to (55), wherein the plurality of physical network parameters includes a required quality of service.

(57) The network entity of anyone of (50) to (56), wherein the plurality of physical network parameters includes a relation between the quality of service and a quality of user experience.

(58) The network entity of anyone of (50) to (57), wherein the plurality of physical network parameters includes a power headroom of a base station.

(59) The network entity of anyone of (50) to (58), wherein the plurality of physical network parameters includes interferences.

(60) The network entity of anyone of (50) to (59), wherein the plurality of physical network parameters includes a baseband processing load and/or channel capacity.

(61) The network entity of anyone of (50) to (60), wherein the plurality of physical network parameters includes a usage of backhaul and/or fronthaul bandwidth.

(62) The network entity of anyone of (50) to (61), wherein the plurality of physical network parameters includes a network key performance indicator related to physical resource usage.

(63) The network entity of anyone of (26) to (62), wherein the loss function is based on the difference between a required quality of service and/or a required quality of experience and an offered quality of service and/or an offered quality of experience.

(64) The network entity of anyone of (26) to (63), wherein the loss function is based on the difference between an ordered traffic and a carried traffic.

(65) The network entity of anyone of (26) to (64), wherein the loss function is based on the difference between estimated network resources and current network resources.

(66) The network entity of anyone of (26) to (65), wherein the loss function is based on the difference between an expected revenue and a current revenue.

(67) The network entity of anyone of (26) to (66), wherein the output of the output layer is overridden by predetermined admission control rules in case of unexpected results and/or in case of results against predetermined preferences.

(68) The network entity of anyone of (26) to (67), wherein the weights of the intermediate layer are trained based on historical training data.

(69) The network entity of (68), wherein the weights of the intermediate layer are trained offline and/or during operation.

(70) The network entity (68) or (69), wherein the weights of the intermediate layer are trained inside a base station and/or an external server for network operation and maintenance.

(71) The network entity of anyone of (68) to (70), wherein the historical data is preprocessed.

(72) The network entity of anyone of (25) to (71), wherein the weights of the intermediate layer are trained for an evaluation of a quality of user experience, and wherein the weights are trained based on user input values corresponding to a rating of a connection quality to the mobile telecommunications system as an output of user experience training data.

(73) The network entity of (72), wherein an input of the user experience training data includes a connection setup success rate.

(74) The network entity of (72) or (73), wherein an input of the user experience training data includes a handover success rate.

(75) The network entity of anyone of (72) to (74), wherein an input of the user experience training data includes a connection cost.

(76) The network entity of anyone of (72) to (75), wherein an input of the user experience training data includes a connection reliability.

(77) The network entity of anyone of (72) to (76), wherein an input of the user experience training data includes a connection throughput.

(78) The network entity of anyone of (72) to (77), wherein an input of the user experience training data includes a connection delay.

(79) A user equipment for a mobile telecommunications system, comprising circuitry configured to receive a radio resource control message in response to the connection request to the mobile telecommunications system including an admission permission condition based on an output of a machine learning algorithm.

(80) The user equipment of (79), wherein the admission permission condition includes a timer indicative for a time when the connection request to the mobile telecommunications system will be accepted.

(81) The user equipment of (79) or (80), wherein the circuitry is further configured to transmit a user input value corresponding to a rating of a connection quality to the mobile telecommunications system.

(82) A method for performing an admission control of a received connection request to a mobile telecommunications system, the method comprising:
 performing the admission control based on a plurality of admission control layers.

(83) A method for performing an admission control of a received connection request to a mobile telecommunications system, the method comprising:
 performing the admission control based on an output of a machine learning algorithm generated for a plurality of admission control layers.

The invention claimed is:

1. A network entity for a mobile telecommunications system, comprising:
circuitry configured to:
receive a connection request requesting connection to the mobile telecommunications system from a user entity;
perform an admission control of the connection from the user entity, wherein the admission control is performed based on a plurality of admission control layers including a service level layer, a network level layer, and a user level layer, wherein the admission control includes a service level admission control determination by the service level layer based upon a service level criterion, a network level admission control determination by the network level layer based upon a network level criterion, and a user level admission control determination by the user level layer based upon a user level criterion, and wherein the admission control is performed based on a prediction corresponding to at least one of the plurality of admission control layers;
determine an admission condition for the connection from the user entity based on the service level admission control determination, the network level admission control determination, and the user level admission control determination; and
transmit a radio resource control message to the user entity in response to the connection request requesting the connection from the user entity, the radio resource control message including the admission condition for the connection from the user entity determined based on the service level admission control determination, the network level admission control determination, and the user level admission control determination,
wherein the admission condition included in the radio resource control message transmitted in response to the connection request requesting the connection from the user entity includes a timer indicative of a time when the connection from the user entity to the mobile telecommunications system will be accepted.

2. The network entity according to claim 1, wherein the service level layer is configured to determine an admission permission or an admission rejection of the connection from the user entity based on a service level agreement.

3. The network entity according to claim 1, wherein the network level layer is configured to determine an admission permission or an admission rejection of the connection from the user entity based on a network situation.

4. The network entity according to claim 1, wherein the user level layer is configured to determine an admission permission or an admission rejection of the connection from the user entity based on a user requirement.

5. The network entity according to claim 1, wherein each of the service level criterion, the network level criterion, and the user level criterion are different.

6. The network entity according to claim 1, wherein
the network level admission control determination is distinct from the service level admission control determination, and the user level admission control determination is distinct from the service level admission control determination and the network level admission control determination.

7. The network entity according to claim 4, wherein the determination of the admission permission or the admission rejection of the connection from the user entity in the user level layer is based on network resources.

8. The network entity according to claim 7, wherein for abundant network resources for existing and future connections, the user level layer determines the admission permission of the connection from the user entity with its on-going services.

9. The network entity according to claim 7, wherein for abundant network resources for existing connections, the user level layer determines the admission permission of the connection from the user entity for high priority connection requests.

10. The network entity according to claim 7, wherein for limited network resources, the user level layer determines the admission permission of the connection from the user entity for high priority connection requests demanding low network resources with high probability.

11. The network entity according to claim 7, wherein for limited network resources, the user level layer determines the admission permission of the connection from the user entity for high priority connection requests demanding high network resources with medium probability.

12. The network entity according to claim 7, wherein for limited network resources, the user level layer determines the admission permission of the connection from the user entity for low priority connection requests demanding low network resources with medium probability.

13. The network entity according to claim 7, wherein for limited network resources, the user level layer determines the admission permission of the connection from the user entity for low priority connection requests demanding high network resources with low probability.

14. The network entity according to claim 7, wherein for scarce network resources, the user level layer determines the admission permission of the connection from the user entity only for high priority connection requests.

15. A network entity for a mobile telecommunications system, comprising:

circuitry configured to:

receive a connection request requesting connection to the mobile telecommunications system from a user entity;

perform an admission control of the connection from the user entity, wherein the admission control is performed based on a plurality of outputs of a machine learning algorithm generated for a plurality of admission control layers including a service level layer, a network level layer, and a user level layer, and wherein each of the plurality of outputs of the machine learning algorithm corresponds to one of the plurality of admission control layers including the service level layer, the network level layer, and the user level layer;

determine an admission condition for the connection from the user entity based on the admission control performed based on the plurality of the outputs of the machine learning algorithm; and transmit a radio resource control message to the user entity in response to the connection request requesting the connection from the user entity, the radio resource control message including the admission condition for the connection from the user entity determined based on the admission control performed based on the plurality of outputs of the machine learning algorithm.

16. The network entity according to claim 15, wherein the service level layer is configured to determine an admission permission or an admission rejection of the connection from the user entity based on the corresponding output of the machine learning algorithm generated according to a service level agreement.

17. The network entity according to claim 15, wherein the network level layer is configured to determine an admission permission or an admission rejection of the connection from the user entity based on the corresponding output of the machine learning algorithm generated according to a network situation.

18. The network entity according to claim 15, wherein the user level layer is configured to determine an admission permission or an admission rejection of the connection from the user entity based on the corresponding output of the machine learning algorithm generated according to a user requirement.

19. The network entity according to claim 15, wherein the admission condition included in the radio resource control message transmitted in response to the connection request requesting the connection from the user entity includes a timer indicative of a time when the connection from the user entity to the mobile telecommunications system will be accepted.

20. A method for a mobile telecommunications system, the method comprising:

receiving a connection request requesting connection to the mobile telecommunications system from a user entity;

performing an admission control of the connection from the user entity, wherein the admission control is performed based on a plurality of outputs of a machine learning algorithm generated for a plurality of admission control layers including a service level layer, a network level layer, and a user level layer, and wherein each of the plurality of outputs of the machine learning algorithm corresponds to one of the plurality of admission control layers including the service level layer, the network level layer, and the user level layer;

determining an admission condition for the connection from the user entity based on the admission control performed based on the plurality of the outputs of the machine learning algorithm; and transmitting a radio resource control message to the user entity in response to the connection request requesting the connection from the user entity, the radio resource control message including the admission condition for the connection from the user entity determined based on the admission control performed based on the plurality of outputs of the machine learning algorithm.

* * * * *